Nov. 11, 1969 R. W. BATTEN 3,477,318
OFFSET DRIVER FOR THREADED FASTENERS
Filed Sept. 8, 1967
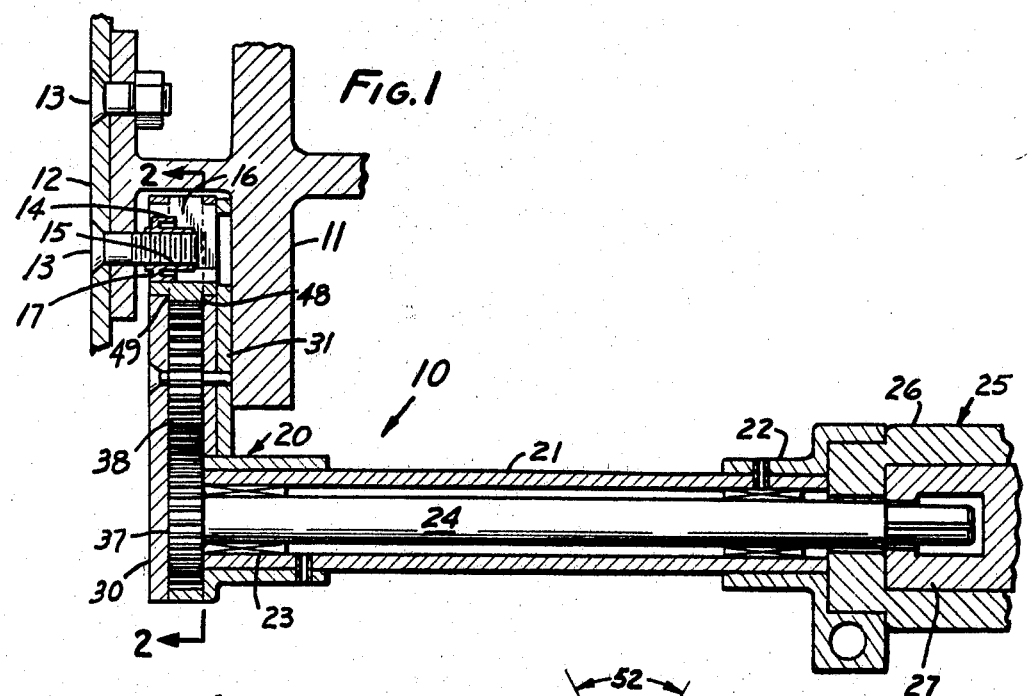
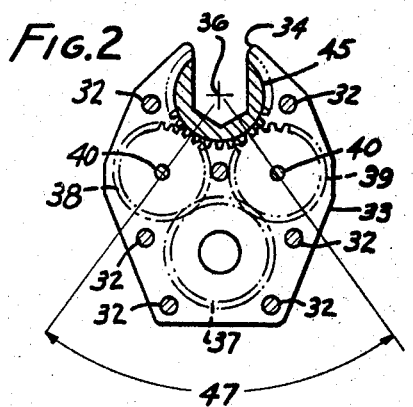
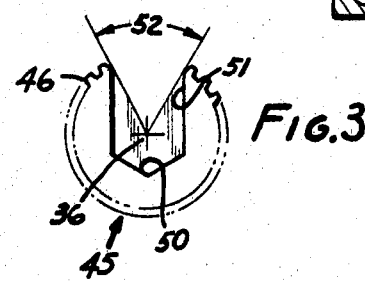
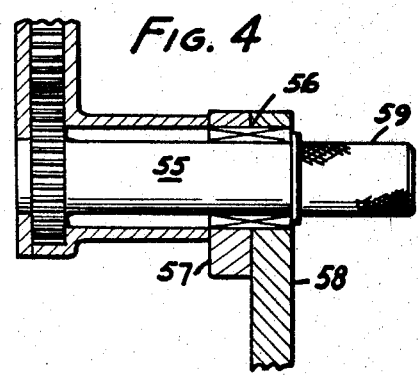
INVENTOR
RONALD W. BATTEN
BY
ATTORNEYS.

United States Patent Office 3,477,318
Patented Nov. 11, 1969

1

3,477,318
OFFSET DRIVER FOR THREADED FASTENERS
Ronald W. Batten, Torrance, Calif., assignor to Hi-Shear Corporation, Torrance, Calif., a corporation of California
Filed Sept. 8, 1967, Ser. No. 666,435
Int. Cl. B25b *17/00*
U.S. Cl. 81—57               5 Claims

ABSTRACT OF THE DISCLOSURE

This invention relates to a driver for setting threaded fasteners in height-limited environments. The driving portion of the device need not be moved axially, but may be applied to the fastener it is to set by lateral movements, thereby significantly reducing height and manipulations. It includes a body to which are mounted a power shaft and a laterally extending gear train driven by the power shaft which gear train terminates in a pair of branches. Each branch includes a driven gear that is engaged to a driving socket. The socket and the body have alignable slots and the angular extent of the slot at the periphery is less than the angular spacing of the driving gears around the center of rotation of the socket whereby the socket is always driven by at least one of the branches.

---

This invention relates to a driver for setting threaded fasteners in height-limited environments, for example where a stud is overhung by a low flange and a nut is to be applied to the stud.

Every installation of a threaded fastener in close quarters involves the problem of clearances to enable one part to be placed atop another in axial alignment therewith prior to threading the parts together. Obviously the minimum clearance is the projecting height of the stud plus the thickness of the nut.

Numerous drivers for offset operations have been devised, for example the device shown in United States Patent No. 3,027,789 which issued to Harry L. Bochman, Jr., on Apr. 3, 1962. These devices enable ratchet or power drives to be used in offset situations, but involve the corollary need, because they use a closed socket, that the nut be inserted in the socket before the socket is inserted in the clearance area which is often a clumsy way of doing things, or to require additional clearance on the order of magnitude of the thickness of the wrench, or to at least partially thread the nut onto the stud by hand before applying the wrench, each of which techniques is inefficient and undesirable. With the instant invention, the nut may simply be started on the thread, and then the driver may be applied laterally to the nut without requiring axial shifting of the nut and the socket, enabling an automatic operation to be carried out without requiring anything more than starting the nut on the threads of the stud, and keeping the minimum clearance.

An offset driver according to this invention includes a body, a power shaft having an axis, the power shaft being rotatably mounted to the body. A laterally extending gear train is rotatably mounted to the body and is drivingly engaged to the power shaft. This gear train includes a plurality of power branches, each branch terminating in a driven gear.

The drive socket is rotatably mounted to the body and this socket includes a fastener-engaging cavity with a slot extending through a side wall of the socket. Bearing means mounts the drive socket to the body, and a progression of gear teeth extends around the outer periphery of the drive socket except at the slot. The path of these teeth intersects the path of teeth of both of the said

2 driven gears. The angular extent of the slot is less than the angular spacing-apart of the driven gears around the center of rotation of the socket so that at least one of the driven gears is always engaged to the teeth on the socket, there being a slot through the body adjacent to the socket member to pass a fastener to be driven to the cavity when the slots are aligned.

According to a preferred but optional feature of this invention, the power shaft is adapted to be driven by a motor.

According to another preferred but optional feature of this invention, the power shaft includes a stub which enables it to be turned independently of the power means in order to align the slots in the body and in the socket with each other.

The above and other features of this invention will be fully understood from the following detailed description and the accompanying drawings, in which:

FIG. 1 is a side elevation principally in axial cross-section showing the presently preferred embodiment of the invention;

FIG. 2 is a fragmentary view taken at line 2—2 of FIG. 1;

FIG. 3 is a plan view of a portion of FIG. 1; and

FIG. 4 is a side elevation principally in axial cutaway cross-section showing another embodiment of the invention.

The presently preferred embodiment of the invention is shown in FIG. 1 wherein an offset driver 10 is operating to join a flanged element 11 to a plate 12 by means of threaded studs 13 and nuts 14. The objective of the driver is to thread the nuts onto the studs.

The nut illustrated in FIG. 1 is an inherently torque-limited type having an internally-threaded sleeve 15, and an external driving section 16 joined to the sleeve by a shear web 17 which shears when a predetermined torque is applied to the driving section. This is an inherently torque-limited class of nut, but it will be understood that this driver is adaptable for use with any class of threaded fastener. Also, the device is shown adapted to set a hexagonal nut. It will be further understood that it may be utilized with any form of driving engagement configuration, this configuration forming no part of the invention.

The offset driver includes a body 20 to which is rigidly mounted a tubular extension 21 which supports a motor mount 22. Bearings 23 are supported inside the tubular extension, and these journal a power shaft 24 for rotation relative to the body. A motor 25 for driving the shaft is shown with its case 26 rigidly mounted to the mounts so it will not be rotatable relative to the body, and with its driving jaws 27 engaged to the power shaft so as to turn the same.

A base plate 30 and a cap plate 31 are joined to each other by fasteners 32. A bearing plate 33 is also similarly attached. The bearing plate is best shown in FIG. 2. It extends to the lateral end of the driver and includes an embrasive opening with a slot 34 which does not rotate, and is at least as wide as the nut to be received so that the nut can enter a socket yet to be described.

A primary gear 37 is mounted to and driven by the power shaft. It drives a pair of driven gears 38, 39 which form respective power paths with the prime gear. These gears are appropriately mounted for rotation by pins 40. The device is held assembled by fasteners 32.

A socket 45 includes a peripheral progression of teeth 46 which teeth are engageable with the teeth of driven gears 38 and 39. Angular subtense 47 is between gears 38 and 39, on center 36.

The peripheral teeth project beyond surfaces 48, 49 of the socket, these surfaces being at opposite ends of the teeth. They are borne against by base plate 30 and bearing plate 33 and these plates hold the socket in the condition as shown. Bearing plate 33 extends beyond the center of rotation 36 forming a re-entrant curve which holds the socket in this position so that it cannot fall out.

The socket itself includes a recess 50 formed with fastener engaging surfaces and with a slot 51 extending all the way through one side thereof. The angular subtense 52 relating to the outer ends of slot 51 will be less than subtense 47.

It will now be seen that because of the relationships of the angular subtense, in many positions the drive socket will be driven by both power branches. However, when the socket slot passes over one or the other of the driven gears, then only one of the branches will be driving. Because of the relationship between the subtenses, however, there will never be a time or position where no power branch is engaged to the socket.

A modification of the device of FIG. 1 is shown in FIG. 4. In this device a power shaft 55 fits in a device which drives a device which is entirely the same out to the socket. However, instead of a motor drive, it includes a unidirectional clutch drive 56 and a first handle 57 attached to the body and a second handle 58 driving the clutch drive. Therefore, by holding handle 57 and turning handle 58 the device may be driven unidirectionally by hand. In order to aid in the alignment of the slots, a stub 59 is provided on the power shaft which enables the power shaft to be turned by hand so as to align the slots of the sockets and of the cap plate.

This device thereby provides a driver which may be inserted laterally onto a nut thereafter to be driven in an offset manner in a height-limited environment either with power or by hand and with further features to enable the device readily to be preadjusted to a slot-aligned condition.

What is claimed:

1. An offset driver for driving threaded fasteners in height-limited environments comprising: a body, a power shaft having an axis, the power shaft being rotatably mounted to the body, a laterally-extending gear train rotatably mounted to the body and drivingly engaged to the power shaft, the gear train including a plurality of power branches, each branch terminating in a driven gear; a drive socket rotatably mounted to the body which socket includes a fastener-engaging cavity with a slot extending through a side wall of the socket; bearing means mounting the drive socket to the body; and a progression of gear teeth on the outer periphery of said drive socket, the path of which teeth intersects the path of the teeth of both of said driven gears, the progression being interrupted by the slot, the angular extent of the slot being less than the angular spacing of said driven gears around the center of rotation of said socket, whereby at least one of said driven gears is always engaged to the teeth on said socket, there being a slot through the body adjacent to the socket member to pass a fastener to be driven to the cavity when the slots are aligned.

2. An offset driver according to claim 1 in which a motor is drivingly connected to and drives the power shaft.

3. An offset driver according to claim 1 in which the housing includes a pair of face plates which retain at least a portion of the gear train, and a cover plate which overlays at least a portion of the socket.

4. An offset driver according to claim 1 in which a unidirectional drive is mounted to the power shaft, and in which a rotatable handle is mounted to the unidirectional drive to drive the power shaft unidirectionally.

5. An offset driver according to claim 4 in which a stub of the power shaft projects to be available to the hand of the user thereby to turn the power shaft, gear train and socket in order to align the slots.

References Cited

UNITED STATES PATENTS

| | | | |
|---|---|---|---|
| 1,767,434 | 6/1930 | Childs | 81—57 |
| 2,703,030 | 3/1955 | Marvin | 81—57 |
| 2,787,180 | 4/1957 | Fish | 81—58.2 X |

JAMES L. JONES, Jr., Primary Examiner